United States Patent

[11] 3,576,077

| [72] | Inventor | Rodney E. Moseman<br>Lititz, Pa. |
|---|---|---|
| [21] | Appl. No. | 801,494 |
| [22] | Filed | Feb. 24, 1969 |
| [45] | Patented | Apr. 27, 1971 |
| [73] | Assignee | Hamilton Watch Company<br>Lancaster, Pa. |

[54] HOLE DIAMETER MEASURING GAUGE
8 Claims, 3 Drawing Figs.

[52] U.S. Cl. ................................................ 33/178
[51] Int. Cl. ................................................ G01b 5/12
[50] Field of Search ........................................... 33/178 (A), 172 (A), 147 (A)

[56] References Cited
UNITED STATES PATENTS

| 1,386,899 | 8/1921 | Samuel | 33/172A |
| 2,786,277 | 3/1957 | Zifferer | 33/178A |
| 2,801,474 | 8/1957 | Field et al. | 33/178A |
| 3,365,803 | 1/1968 | Binns et al. | 33/147A |

Primary Examiner—Samuel S. Matthews
Attorney—Le Blanc and Shur

ABSTRACT: The measuring gauge has an elongated cylindrical casing housing a plunger mounted for axial reciprocal movement and carrying a constantly tapered measuring needle at one end externally of the casing. The plunger is biased to a fully-extended position by a helical spring and carries a rack engageable with a pinion which drives a hand on a dial readout. A second hand is geared to the first pinion and the dial hands provide coarse and fine readouts. Insertion of the tapered needle into the hole with the corresponding end of the casing moved to butt the annular margin about the hole provides a hole diameter readout on the dial. A cam locks the plunger member in the measuring position, whereby the needle may be withdrawn from the hole and retained in the measuring position.

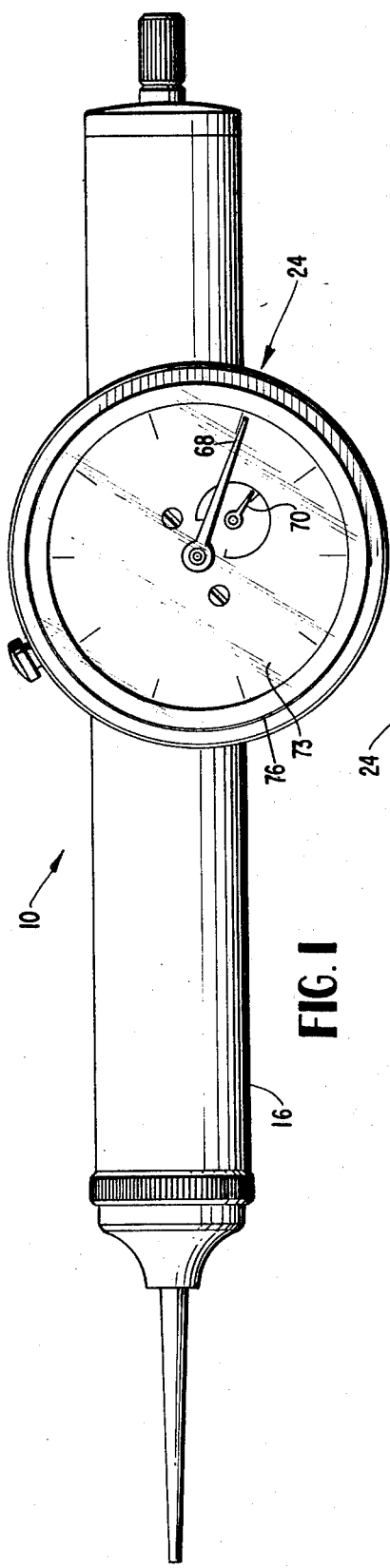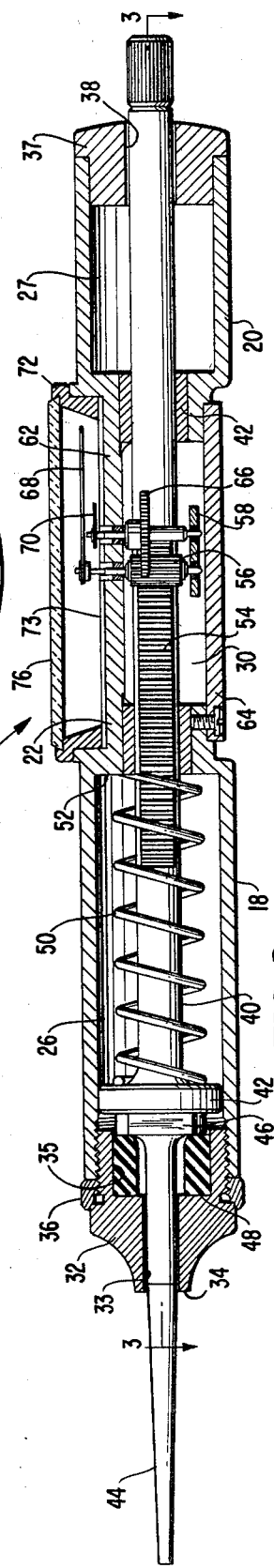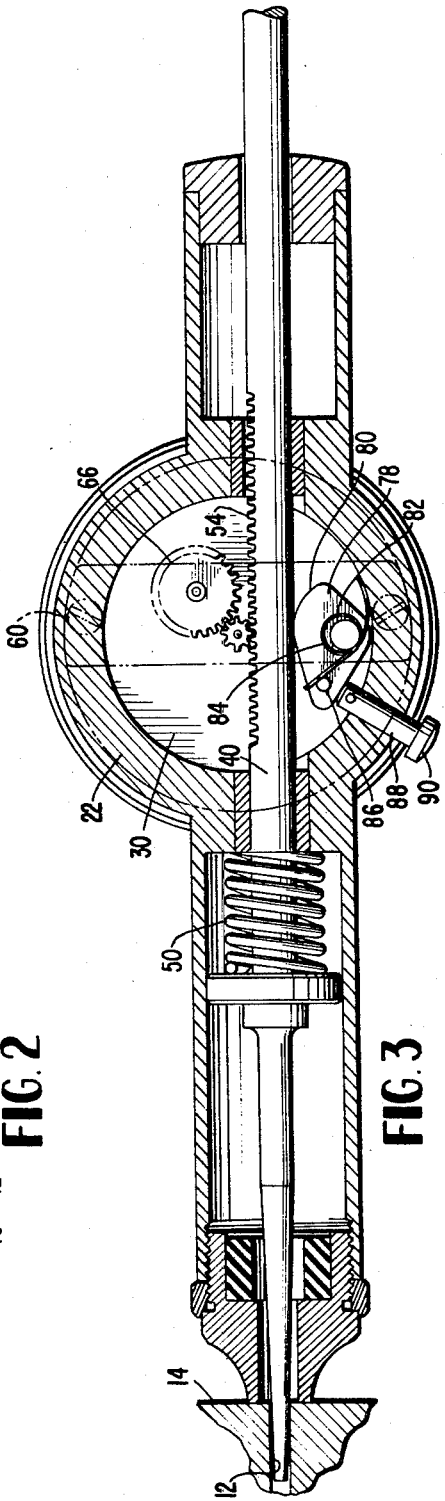

HOLE DIAMETER MEASURING GAUGE

The present invention relates to a gauge for measuring internal hole diameters and particularly relates to a gauge having a tapered measuring needle adapted to be inserted into a hole for measuring the internal diameter of the hole. Specifically, the present invention relates to a precision measuring gauge employing a rack and pinion drive for accurately determining internal hole diameters with the measurement being displayed on a dial readout.

Gauges for measuring internal hole diameters have been provided in the past. One such gauge is described and illustrated in U.S. Pat. No. 2,786,277 of common assignee herewith. In that patent, a spindle is spring-biased for axial, reciprocal movement within a casing and carries at one end a measuring needle having a constant taper. The needle is adapted for insertion into a hole, the diameter of which is to be measured. The opposite end of the spindle carries a graduated measuring scale which translates the axial displacement of the plunger and needle between a reference position and a position wherein the tapered needle engages the sides of the hole to provide a direct measurement of the hole diameter. Specifically, when the needle is inserted into the hole such that the needle surface engages the internal periphery of the hole and the corresponding end of the casing butts the annular margin about the hole, the extent of the axial displacement of the spindle from a reference position is a function of the hole diameter since the taper of the needle is constant and known. The hole diameter can thus be read out at the opposite end of the spindle on an appropriate scale. Actuation of this gauge for a measurement, however, requires the release of a trigger, and the cooperating action of a pair of helical springs, ball bearings, a sleeve, a tapered recess, as well as other parts. This necessarily increases the cost of manufacture and assembly of this gauge. Moreover, the accuracy of this type of gauge is limited. Another hole diameter measuring gauge is disclosed in U.S. Pat. No. 2,801,474. In that patent, there is disclosed a cylindrical housing having a plunger which has a tapered end edge engageable within the hole, the diameter of which is to be measured. A guage is mounted on the opposite end of the housing and the corresponding end of the plunger reciprocates an anvil within the gauge. The end of the anvil engages a pivotably mounted arcuate gear segment engageable with a spur gear which drives a relatively fine diameter measuring indicating hand. Another gear is fixed to the anvil about its pivotal axis and drives a gear train for rotating a coarse diameter measuring hand. In this patent, a large tapered end edge is employed for compatibility with the short range of travel of the arcuate gear segment actuated movement. The accuracy of this type of gauge is accordingly limited due to the employment of the large tapered end edge. For example, where tapered needles or end pieces are employed to measure the diameter of the hole, the actual measurement is taken about the hole at its corner break or radius. This corner radius is common to all holes as a sharp corner is practically impossible to achieve on production parts. Thus the error introduced by employing a large tapered end is significant, the large tapered end being necessary for compatibility with the arcuate gear segment.

While the prior gauge disclosed in U.S. Pat. No. 2,786,277 has proven satisfactory for most measurements and the gauge disclosed in U.S. Pat. No. 2,801,474 has been employed where great accuracy is not required, it has been found desirable to obtain even finer and more precise measurements of internal hole diameters for example on the order of 0.0002 inch, than has heretofore been possible with such prior gauges. It has also been found desirable to provide such precision and fine measurements on a gauge having a dial readout as well as to reduce the number of parts of the gauge and hence its cost.

To these ends, the present invention provides an improved gauge for measuring internal hole diameters which is characterized by a cylindrical casing having a plunger mounted for axial reciprocal movement within the casing and carrying a constantly and fine tapered measuring needle externally of the casing. The plunger is encompassed by a helical spring biasing it to a normally fully extended position. The plunger also carried a rack engageable with a pinion pivotally carried by the casing and connected to a dial hand overlying suitable measuring indicia on a dial readout which forms an integral part of the casing intermediate its ends. A second gear is engageable with the pinion and drives a second dial hand also displayed on the dial readout whereby the two dial hands provide additive coarse and fine hole diameter measuring indications.

A feature of the present invention includes a cam normally spring-biased into engagement with the plunger, the cam functioning as a one-way clutch permitting axial movement of the plunger in one direction against the bias of the spring and locking it against axial movement in the other direction under the spring bias. An externally operated button or pin is engageable with the cam to pivot the latter out of engagement with the plunger to release the latter permitting the needle to move to its normally fully extended position. In this manner, when the measurement is taken and the plunger is axially displaced relative to the casing by inserting the tapered needle thereof into the hole and moving the casing to butt the corresponding end of the casing about the margin of the hole, the gauge may be withdrawn with the cam substantially locking the plunger in the measured position. The dial hands are thus retained in the measuring position and can be read with the gauge removed from the hole. The button or pin may then be depressed to release the plunger which then returns to its normally fully-extended position under the bias of the spring.

Accordingly, it is a primary object of the present invention to provide an improved gauge for measuring internal hole diameters.

It is another object of the present invention to provide an improved measuring gauge affording fine and precision measurements of internal hole diameters.

It is still another object of the present invention to provide an improved gauge for measuring internal hole diameters and having a dial readout.

It is a further object of the present invention to provide an improved gauge for measuring internal hole diameters which is comprised of a minimum number of parts, and which may be readily, easily and inexpensively constructed.

It is a still further object of the present invention to provide an improved gauge for measuring internal hole diameters which can be withdrawn from the measuring position with the dial hands automatically retained in the measured position.

These and further objects and advantages of the present invention will become more apparent upon reference to the following specification, appended claims and drawings wherein:

FIG. 1 is a side elevational view of a measuring gauge constructed in accordance with the present invention;

FIG. 2 is a longitudinal, cross-sectional view thereof illustrating the plunger member in a normally fully-extended position; and FIG. 3 is a cross-sectional view thereof taken about on line 3-3 of FIG. 2.

REferring now to the drawings, and particularly to FIG. 1, there is illustrated a gauge, generally indicated at 10, for measuring the internal diameter of a hole 12 in a member 14 (FIG. 3). Gauge 10 includes a cylindrical casing 16 having axially-spaced cylindrical end portions 18 and 20 with a cylindrical body portion 22 disposed between end portions 18 and 20 at right angles thereto and carrying a dial display or readout generally indicated at 24. End portions 18 and 20 define cylindrical chambers 26 and 27 respectively, and a cylindrical chamber 30 is defined within cylindrical body portion 22. An externally-threaded end cap 32 is threadedly received within an internally threaded end of cylindrical portion 18 and cap 32 has a central bore hole 33. Cap 32 has a reduced annular area 34 formed at its outer end and has an internal recess 35 formed through its inner face for purposes as will presently become clear. A lock nut 36 is threaded about end cap 32 whereby the end cap may be secured in a selected axially adjusted position relative to casing 10 for gauge calibration purposes. A plug 37 having a central bore 38 closes the opposite end of casing 10 at the open end of cylindrical portion 20.

A plunger 40 is carried within casing 10 for axial reciprocal movement therein and is carried by a pair of axially spaced bearings 42 suitably mounted adjacent opposite ends of cylindrical body portion 22. Plunger 40 carried a piston 42 for sliding movement within cylindrical chamber 26 and a measuring needle 44 is suitably secured against the outer face of piston 42 by a threaded projection which is received in a complementary threaded bore in piston 42, the projection and bore not being shown. Measuring needle 44 extends through bore 33 of end cap 32 and a diametrically-enlarged end portion 46 on needle 44 butts an annular cushion 48 disposed within recess 35. The exposed portion of needle 44 beyond end face 34 when the plunger is in the fully-extended position as illustrated in FIG. 2 is provided with a fine, constant taper throughout its full length. A helical spring 50 encompasses a portion of the plunger 40 within chamber 26 with one end of the spring 50 bearing against the inner face of piston 42 and the opposite end of spring 50 bearing against the inner annular end face 52 in cylindrical chamber 26. The opposite end of plunger 50 extends through cylindrical chamber 27 and through the opening 38 in enclosure cap 37.

An intermediate portion of plunger 50 is provided with a rack gear 54 engageable with a pinion gear 56. Gear 56 is mounted in suitable bearings in a mounting plate 58 secured to cylindrical housing portion 22 as by screws 60 (FIG. 3) and in the baseplate 62 underlying the dial readout 24, baseplate 62 forming an integral part of casing 10. A closure plate 64 is provided housing 22 on the side thereof opposite dial readout 24. A gear 66 likewise pivotally mounted in suitable bearings in mounting plate 58 and dial baseplate 62 lies in mesh with pinion gear 56. The shafts on which gears 56 and 66 are carried mount respective dial hands or arms 68 and 70 which form a part of the dial 24. Dial 24 also includes an annular bezel 72 which is secured about the dial baseplate 62 and clamps a dial face 73 to baseplate 62, dial face 73 carrying suitable indicia which cooperate with the dial hands 68 and 70 to provide respective fine and coarse measurements. A crystal 76 is suitably secured to bezel 72 in the usual fashion.

Referring now particularly to FIG. 3, there is illustrated a one-way clutching device for locking the plunger in the axial position to which it is moved when the hole diameter measurement is made as hereinafter amplified. To this end, a cam 78 having a cam surface 80 is mounted for pivotal movement about a pin 82 carried by mounting plate 58. A helical spring 84 is wound about pin 82 with one end of the spring bearing against the inner arcuate face of cylindrical housing 22 and the opposite end bearing against a pin 86 upstanding from cam 78 whereby the cam 78 is normally biased in a counterclockwise direction as seen in FIG. 3 such that the cam surface 80 normally engages the plunger 40, The cam surface 80 is such as to permit axial movement of plunger 40 in one direction against the bias of spring 50 (from left to right as viewed in FIG. 3) and to frictionally engage the plunger 40 to prevent axial movement of the plunger 40 in the opposite direction under the return bias of spring 50. A pin 88 s slidably received through the cylindrical housing 22 and engages cam 78. The pin 88 carries a button 90 on its outer end whereby depression of the pin pivots cam 78 clockwise as viewed in FIG. 3 to unlock or release cam surface 80 from frictional engagement with the plunger 40 whereby plunger 40 is permitted to return to its normal position with the needle 44 fully extended as seen in FIG. 2.

Prior to use, the gauge is preferably calibrated such that a diameter reading on dial 24 equal to the known diameter of the tip of needle 44 is provided when the tip lies flush with annular surface 34. Alternatively, the gauge may be calibrated such that the dial reads the diameter of any known position along the constantly tapered needle as provided by a scribe line or lines not shown, when such line or lines are aligned with the surface 34. As a further example, the dial can be calibrated to indicate the diameter of the base of the needle aligned with surface 34 when the needle is fully extended as illustrated in FIG. 2. To measure the diameter of a hole, for example, the diameter of hole 12 in part 14, needle 44 is inserted into the hole with the tapered side thereof engaging about the lip or corner break of the hole. The gauge 10 is then moved toward the hole such that the annular surface 34 butts the marginal portions of part 14 abut the hole 12. In this manner, plunger 40 is displaced inwardly relative to casing 10 against the bias of spring 50. This inward displacement of plunger 40 causes rack 54 to drive pinion gear 56 which in turn drives gear 66 thereby simultaneously rotating the respective dial hands 68 and 70 abut the dial face 24. The diameter of the hole 12 may then be read utilizing the fine and coarse measurements respectively provided by dial hands 68 and 70.

During the axially inward displacement of plunger 40, the latter is free to move past cam 78 since the latter is frictionally retained against plunger 40 only by the bias of spring 84. When the gauge 10 is removed from the hole, cam 78 frictionally engages plunger 40 under the bias of spring 84 to lock the plunger in its inwardly displaced measuring position and against the return bias of spring 50. In this manner the gauge can be removed from the hole 12 with the measurement being continuously displayed on dial face 24. To return the plunger 40 to its fully-extended position, pin 88 is depressed to pivot cam 78 out of frictional locking engagement with plunger 40 whereby the latter is automatically displaced to the axial position illustrated in FIG. 2 under the bias of spring 50.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A gauge for measuring the internal diameter of a hole comprising: an elongated housing, a plunger mounted within said housing for axial reciprocal movement relative thereto, means for biasing said plunger for axial movement in one direction, said plunger having an end portion movable through a corresponding end portion of said housing and including a constantly tapered needle receivable within a hole, a rack carried by said plunger, a gear engageable with said rack and rotatable in response to axial displacement of said plunger relative to said housing, means coupled to said gear for indicating the diameter of the hole and including a dial hand, and means for automatically locking said plunger in selected axial positions relative to said housing throughout the full range of axial movement of said plunger in the other direction and for releasing said plunger from said locked positions for movement in said one direction.

2. A gauge according to claim 1 wherein said diameter indicating means includes a dial gauge carrying said dial hand, said dial gauge being located intermediate the length of said elongated housing.

3. A gauge according to claim 1 wherein said biasing means includes a spring encompassing a portion of said plunger with opposite ends engageable with said plunger and said housing, a second gear engageable with said first-mentioned gear and means coupled to said second gear for indicating the diameter of the hole and including a second dial hand, said first and second gears having different diameters, whereby the hands associated with said gears provide coarse and fine measuring indications, said locking means including a pivotally mounted cam movable into a first position engageable with said plunger to lock the latter in said selected axial positions and means for moving said cam into a second position out of engagement with said plunger to release the latter, said latter means including a spring normally biasing said cam into said first position and a member operable externally of said casing and engageable with said cam to pivot said cam against the bias of said spring into said second position.

4. A gauge according to claim 1 wherein said biasing means includes a spring encompassing a portion of said plunger with opposite ends engageable with said plunger and said housing.

5. A gauge according to claim 1 including a second gear engageable with said first-mentioned gear and means coupled to said second gear for indicating the diameter of the hole and including a second dial hand.

6. A gauge according to claim 5 wherein said first and second gears have different diameters, whereby the hands associated with said gears provide coarse and fine measuring indications.

7. A gauge according to claim 1 wherein said locking means includes a pivotally mounted cam movable into a first position engageable with said plunger to lock the latter in said selected axial positions and means for moving said cam into a second position out of engagement with said plunger to release the latter.

8. A gauge according to claim 7 including a spring normally biasing said cam into said first position and a member operable externally of said casing and engageable with said cam to pivot said cam against the bias of said spring into said second position.